United States Patent
Petsche

(10) Patent No.: US 12,305,611 B2
(45) Date of Patent: May 20, 2025

(54) ROTOR BLADE OF A WIND TURBINE AND CORRESPONDING WIND TURBINE

(71) Applicants: WEG Equipamentos Elétricos S.A., Jaraguá do Sul—SC (BR); Bewind GmbH, Rendsburg (DE)

(72) Inventor: Marc Petsche, Berlin (DE)

(73) Assignees: Bewind GmbH, Rendsburg (DE); WEG Equipamentos Elétricos S.A., Jaraguá do Sul—SC (BR)

( * ) Notice: Subject to any disclaimer, the term of this patent is extended or adjusted under 35 U.S.C. 154(b) by 25 days.

(21) Appl. No.: 18/227,392

(22) Filed: Jul. 28, 2023

(65) Prior Publication Data

US 2024/0035437 A1 Feb. 1, 2024

Related U.S. Application Data

(60) Provisional application No. 63/393,666, filed on Jul. 29, 2022.

(51) Int. Cl.
*F03D 1/06* (2006.01)

(52) U.S. Cl.
CPC ....... *F03D 1/06495* (2023.08); *F03D 1/0647* (2023.08); *F05B 2250/71* (2013.01)

(58) Field of Classification Search
None
See application file for complete search history.

(56) References Cited

U.S. PATENT DOCUMENTS

| | | | |
|---|---|---|---|
| 4,655,412 A * | 4/1987 | Hinkleman | B64C 3/14 244/35 R |
| 8,226,368 B2 * | 7/2012 | Standish | F01D 5/14 416/DIG. 2 |
| 8,814,525 B2 * | 8/2014 | Petsche | F03D 1/0641 416/243 |
| 9,932,960 B2 * | 4/2018 | Petsche | F03D 1/0675 |

\* cited by examiner

*Primary Examiner* — Kayla Mccaffrey
(74) *Attorney, Agent, or Firm* — Nixon Peabody LLP

(57) ABSTRACT

A rotor blade for a wind turbine is provided. The rotor blade includes a high lift root profile with flat-back trailing edge with a suction side and a pressure side, a relative airfoil thickness being between 45% and 75% or between 48% and 70% of a chord length. A trailing edge thickness is between 30% and 75% or between 35% and 60% of the relative airfoil thickness. The chord position of the maximum relative airfoil thickness, which is measured from a leading edge towards the trailing edge, is between 35% and 45% or between 36% and 42% of the chord length. Also provided is a wind turbine equipped with the rotor blade(s).

6 Claims, 7 Drawing Sheets

EXAMPLE B

EXAMPLE A

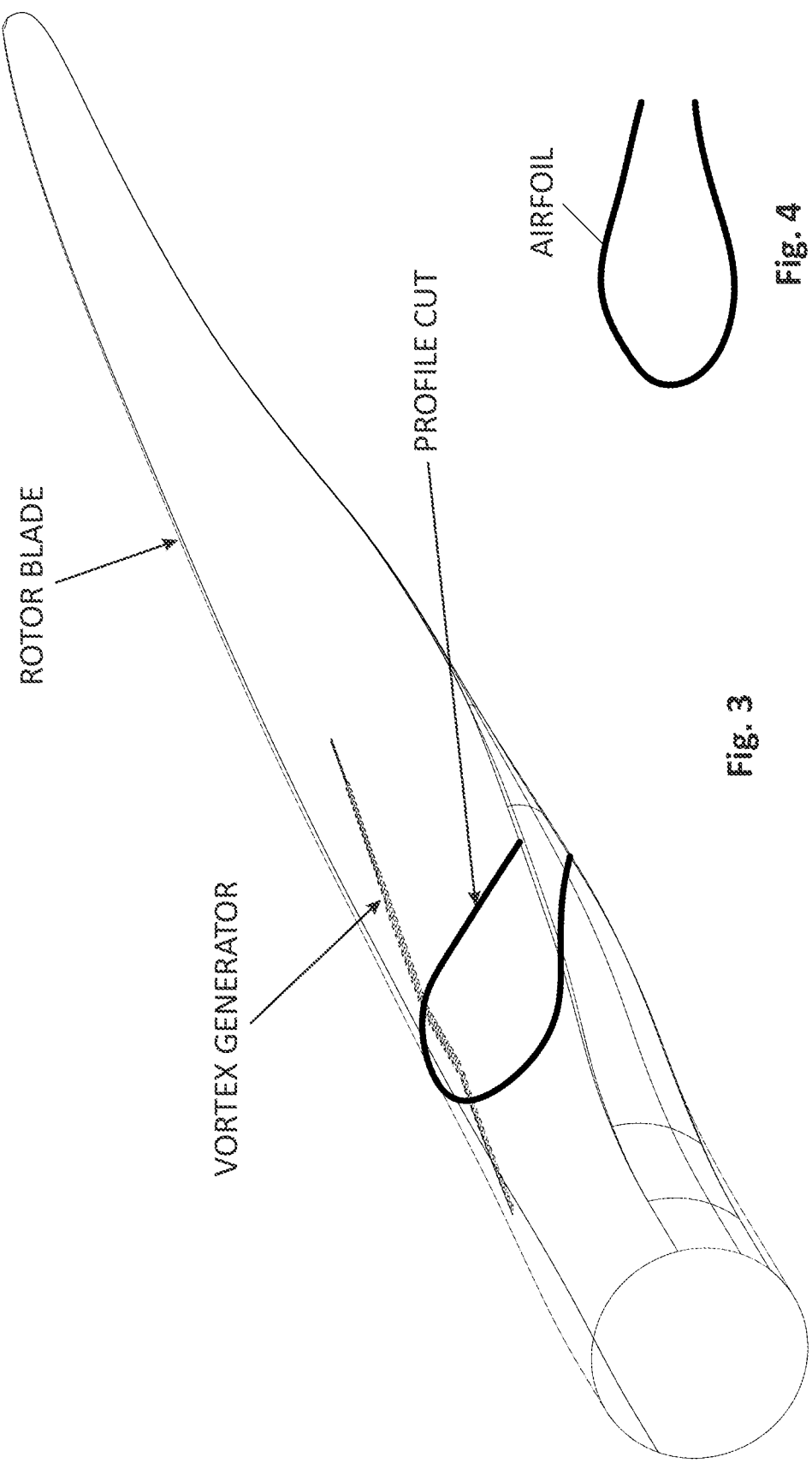

CONVENTIONAL PROFILE A
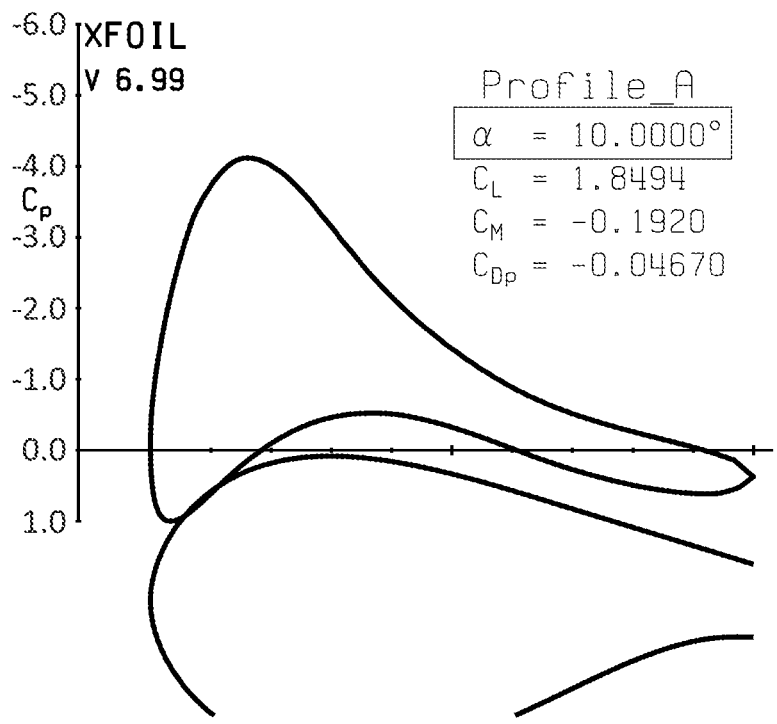
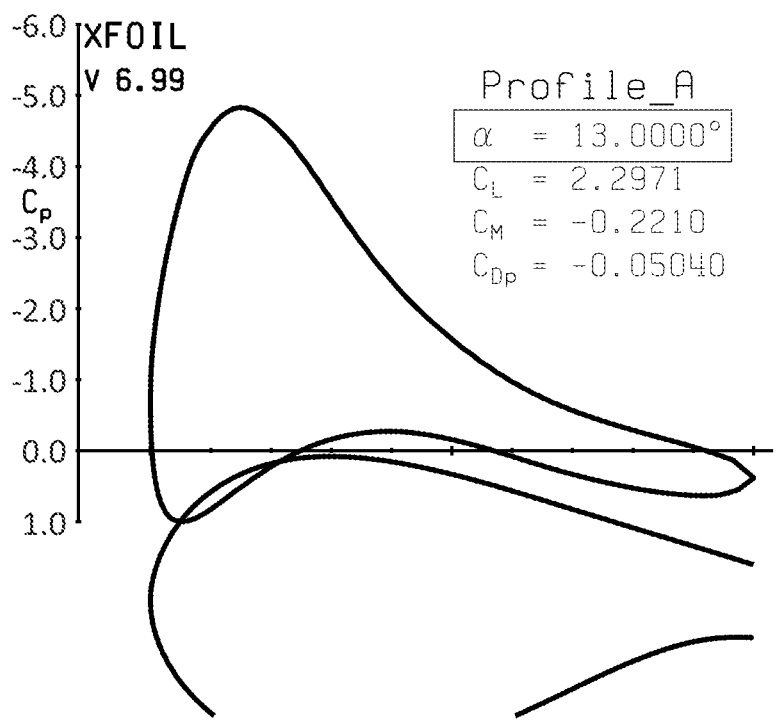
Fig. 5a

CONVENTIONAL PROFILE B
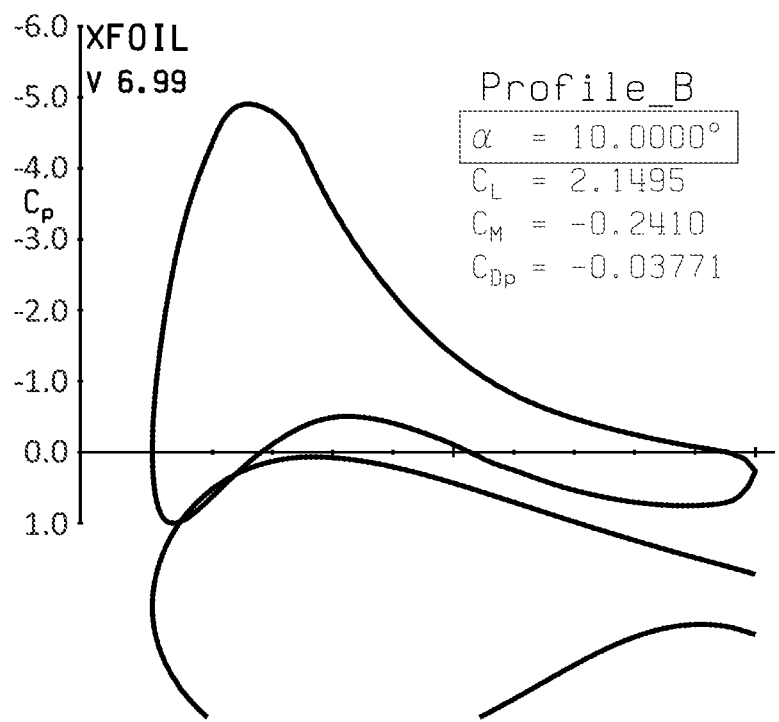
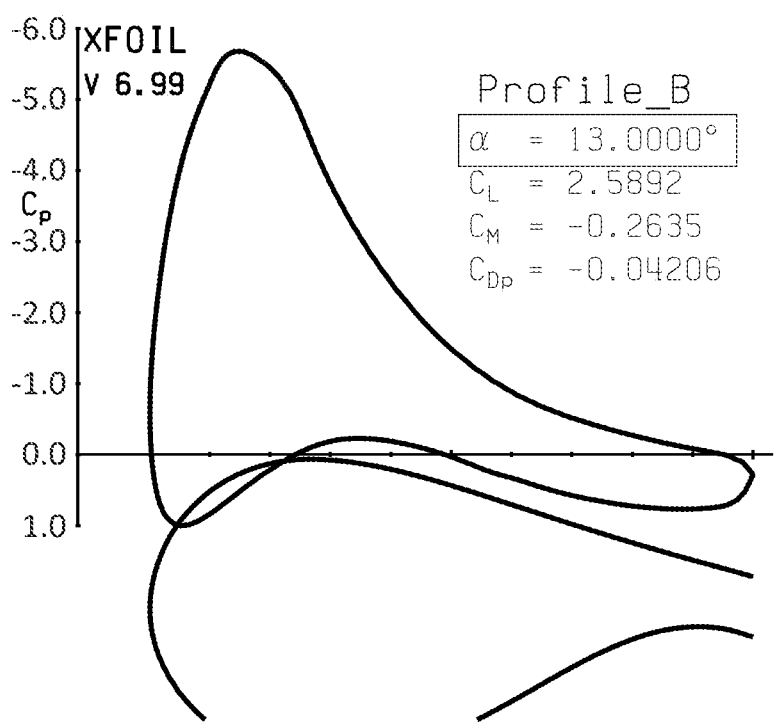
Fig. 5b

ROTOR BLADE OF A WIND TURBINE AND CORRESPONDING WIND TURBINE

CROSS-REFERENCE TO RELATED APPLICATIONS

This application claims the benefit under 35 U.S.C. § 119 (e) of U.S. Provisional Patent Application No. 63/393,666 filed on Jul. 29, 2022, which is incorporated herein by reference in its entirety.

FIELD OF APPLICATION

The present invention pertains to the field of wind turbines, to blades of horizontal-axis wind turbine rotors, and, more particularly, to rotor blade profiles with flat-back trailing edges.

BACKGROUND OF THE INVENTION

Wind turbines are rotary machines used for transforming dynamic fluid energy into rotary energy, consisting essentially of a tower and a nacelle housing a generator connected to a rotor with blades, said rotor blades having an external airfoil shape or profile designed according to the aerodynamic demands involved in the process of converting mechanical energy into electrical energy.

The wind flows across the rotor blades from a leading edge to a trailing edge, decreasing the pressure on one of the profile's sides (suction side or top side) and increasing the pressure on the opposite side (pressure side or bottom side). This air pressure differential between the two sides of the rotor blade's profile creates both lift and drag and, when the component of the lift force in the rotor plane is stronger than the component of the drag force in the rotor plane, the rotor starts to spin. The rotor connects to the generator, either directly or through a gearbox to increase the rotation speed of the shaft, translating the aerodynamic force into rotation and thus generating electricity.

Hence, the higher the lift-to-drag ratio of the airfoil's profile, the more efficient and effective the wind turbine and it is also important to consider optimizing constructive characteristics that directly influence the energy yield, such as airfoil (blade) size and structural weight, among others.

Airfoil profiles designed for achieving a high lift-to-drag ratio at high design lift coefficients, improve the aerodynamic performance and wind energy capturing of the wind turbine and allow the reduction of the chord length (distance between the leading edge and the trailing edge) of the blade, thus resulting in structural weight reduction. The use of flat-back airfoils specially for the inboard of the blade (section closer to the rotor hub) is also important for improving the structural performance by reducing structural weight.

Thick profiles for rotor blades are profiles with relative thicknesses (maximum vertical thickness to chord length ratio) above 35% and may have a truncated trailing edge (blunt trailing edge, flat back) or not. In both cases, the profile has a pressure distribution where the point of the maximum negative pressure (suction tip) on the suction side of the profile (top side) moves close to the profile nose with increasing angles of attack. Since the local pressure on the profile surface corresponds to the local velocity of the profile, the pressure distribution is therefore an image of the flow velocity distribution around the profile.

Thick profiles are used in rotor blades for wind turbines especially in the area of the blade root (i.e., close to the rotor hub), where, due to the smaller local circumferential speeds, the angle of attack of the profile cuts increases compared to profiles more outboard of the blade. This means that with conventional profiles, the maximum local speed around the profile for the angles of attack at which the profile is used is located close to the profile nose.

Vortex generators are used to increase the performance of rotor blades and consist essentially of small fins installed at the suction side especially toward the root of the wind turbine blade, reducing airflow separation (stall) at high angles of attack, resulting in higher lift, lower drag and more torque to turn the rotor and generate power. Vortex generators improve the performance especially, when the leading edge of the airfoil is soiled, and the boundary layer is completely turbulent. An airfoil with turbulent boundary layer, without vortex generators, separates at much lower angles of attack and lower lift than a clean airfoil.

Vortex generators are often mounted in the area of the blade root on the profiles with a large relative thickness. These vortex generators produce wake vortices that feed the boundary layer of the flow around the profile downstream with additional energy. As a result, the flow on the suction side of the profile starts only to separate (stall) at higher angles of attack and thus the profile works well accordingly at larger angles of attack and generates desired higher lift. An additional way to improve the aerodynamic performance of airfoils is the use of gurney flaps which are small lips placed on the pressure side at the trailing edge of the blade, which generate more lift and delay the onset of stall.

Vortex generators work better the greater the local inflow velocity (kinetic energy) of these components is, but the influence of the vortex generators decreases with the length of the flow behind the vortex generators. This means that for an optimal effect of the vortex generators, they should be mounted at the highest possible local speed and at the same time sit as far back as possible on the suction side of the profile.

In the case of clean profiles (normal state), the type of the boundary layer changes from laminar to turbulent just behind the suction tip—i.e., when the boundary layer of the flow is slowed down again. Laminar boundary layer is much thinner than turbulent boundary layer. It is therefore advantageous when the vortex generator sits in the area of the suction tip—i.e., the maximum profile flow velocity—in the laminar boundary layer. Thus, most of the vortex generator is flown in at the undisturbed flow velocity and works particularly effectively.

These combined conditions pose a complex challenge for builders and manufacturers of wind turbine rotor blades, as they make it necessary to generate high local flow velocity further back on the profile, providing a high inflow velocity of the vortex generator further back on the profile still with a laminar boundary layer, allowing the profile to still work without flow separation at higher angles of attack (which is desired, because then the rotor blade can generate more power, i.e., provide more energy yield), and at the same time reducing the height of the trailing edge (which is desired for easier production of the blade, i.e. reducing construction costs and the drag of the profile and so increasing the energy yield), and the point of the maximum thickness of the profile to be pushed further towards the profile trailing edge (which is desired for a lighter blade structure, i.e. material savings and thus also for lower loads to the turbine).

PRIOR ART

There are several solutions in the state of the art aimed at improving thick airfoil profiles efficiency and energy yield of wind turbines.

An example are thick profiles with relatively small trailing edge thickness, like 5% of the chord length for a profile with 40% relative thickness or a trailing edge thickness like 10% of the chord length for a profile with 50% relative thickness and a location of the maximum profile thickness below 30% chord length. These profiles have a smaller maximum angle of attack where they provide linear lift behavior—especially in soiled conditions—and a smaller maximum lift—especially in soiled conditions—than the invented profiles. These properties of the thick state of the art profiles leads to an inadequate performance of the root area of the rotor blade because the energy of the wind in this area of the rotor blade is not fully utilized.

Another example of the related art is the document U.S. Pat. No. 8,814,525B2, which describes a profile of a rotor blade and rotor blade of a wind power plant, which is, according to the abstract of the referred document, characterized in that the main camber line runs beneath the chord at least in sections in the direction of the pressure side.

Said airfoils have a maximum value of the chordwise location of the maximum thickness of 35%, and a quite constant curved suction side, which will result in a forward position of the suction peak at high angles of attack. These profiles also have a very high trailing edge thickness, which is a structural disadvantage. The reason is, that such airfoils were not originally designed for the use with vortex generators.

As can be inferred from the description above, there is room and demand for a solution for profiles able to generate high local flow velocities and corresponding suction peaks further back on the profile, providing a higher inflow velocity of the vortex generators further back on the profile still with a laminar boundary layer, allowing the profile to still work without flow separation at higher angles of attack and, at the same time, having a moderate height of the trailing edge and with the point of the maximum thickness of the profile to be pushed further towards the profile trailing edge.

OBJECTS OF THE INVENTION

Therefore, one of the objects of the present invention is providing a rotor blade for a wind turbine, according to the characteristics of claim 1 of the appended set of claims.

Another object of the present invention is providing a corresponding wind turbine, according to the characteristics of claim 5 of the appended set of claims.

Additional characteristics and characteristics details are presented in the dependent claims.

BRIEF DESCRIPTION OF THE FIGURES

For a better understanding and visualization of the object, the present invention will now be described with reference to the appended figures, representing the obtained technical effect through an example embodiment without limiting the scope of the present invention, in which, schematically:

FIG. 3 shows a schematic perspective view of a rotor blade according to the invention, with a partial detail of the profile cut close to the rotor hub.

FIG. 4 shows a schematic side view of the invention's profile cut of FIG. 3.

FIG. 5a shows the pressure distribution versus chord length along a conventional profile A at angles of attack of 10° and 13°.

FIG. 5b shows the pressure distribution versus chord length along a conventional profile B at angles of attack of 10° and 13°, with about 50% relative profile airfoil thickness.

DETAILED DESCRIPTION OF THE INVENTION

Figure 1B:
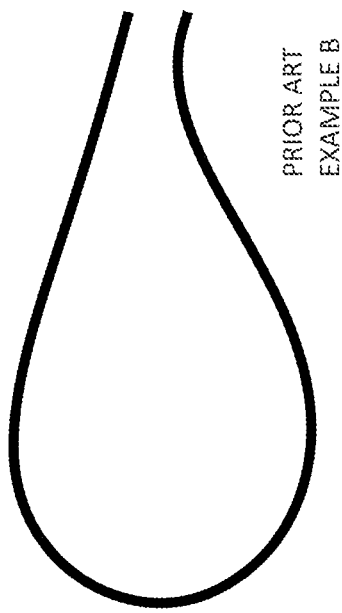
FIG. 1b shows a schematic side view of a conventional profile known from the prior art, herein called prior art example B or conventional profile B.
Figure 1A:
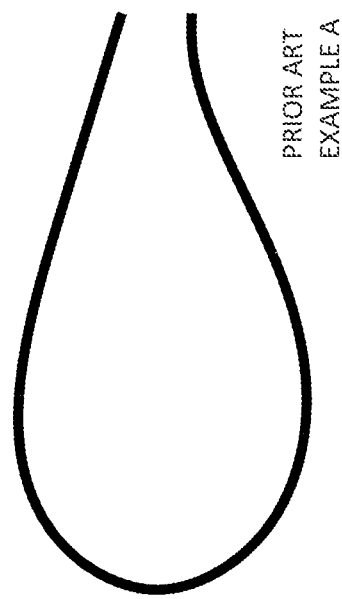
FIG. 1a shows a schematic side view of a conventional profile known from the prior art, herein called prior art example A or conventional profile A.
Figure 2:
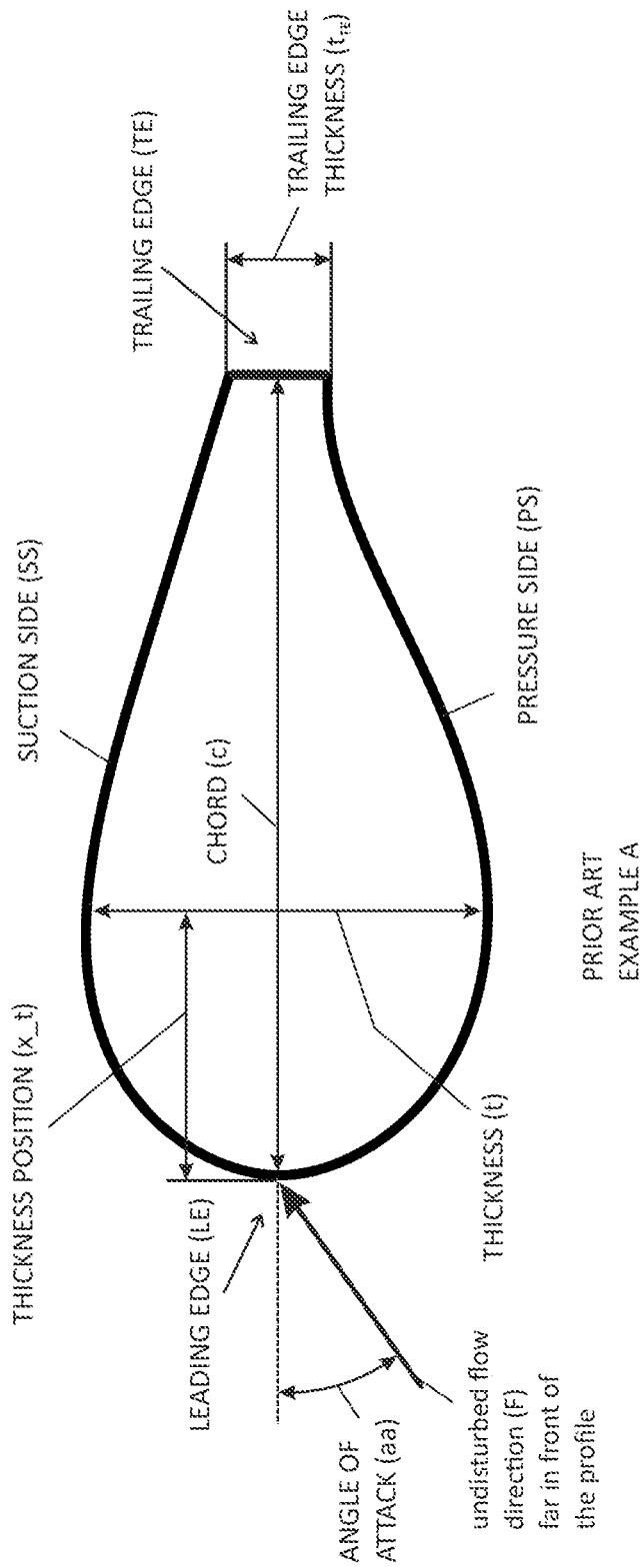
FIG. 2 shows a schematic side view of the profile cut of FIG. 1, with the indication of the most relevant parameters of an airfoil.

The present invention relates to rotor blades with high lift root profiles with a flat-back trailing edge (TE), with optimized design and lift-to-drag ratios.

An airfoil (airfoil) for a rotor blade according to the invention has a relative airfoil thickness (t) (maximum vertical thickness to chord length ratio) in between 45% and 75%, preferably, in between 48% and 70% of the chord length (c).

The trailing edge thickness (tTE) is between 30% and 75%, preferably between 35% and 60% of the relative airfoil thickness (t). For an airfoil with 48% relative airfoil thickness (t), this corresponds to 14.4% to 22.1% of the chord length (c) and for a 66% relative airfoil thickness (t), this corresponds to 19.8% to 30.4% of the chord length (c).

The chord position (x_t) of the maximum relative airfoil thickness (t) is between 35% and 45%, preferably between 36% and 42% of the chord length (c), measured along the chord from the leading edge (LE) towards the trailing edge (TE).

The geometry of the suction side (SS) is such that the suction peak of the pressure distribution is located at a position of at least 30% of the chord length (c), measured from the leading edge (LE) up to an angle of attack (aa) of 15° or, even better, up to an angle of attack (aa) of 25°.

It is to be noticed that for a profile with a truncated trailing edge (TE), the chord line runs from the center of the trailing edge (TE) to the farthest point of the profile (leading edge (LE)). Thus, the angle of attack (aa) of a profile is the angle between the direction of the undisturbed flow (F) and the chord line.

Therefore, the geometry of the suction side (SS) has a suction peak of the pressure distribution located at a position of at least 30% of the chord length (c), measured from the leading edge (LE) up to an angle of attack (aa) in degrees that is at least 35% of the relative airfoil thickness (t) in percent of the chord length (c). For a 45% relative airfoil thickness (t) airfoil that means angles (aa) of attack up to 15.75°, for a 50% relative airfoil thickness (t) airfoil up to 17.75°, for a 55% relative airfoil thickness (t) airfoil up to 19.25°, for a 60% relative airfoil thickness (t) airfoil up to 21°, for a 65% relative airfoil thickness (t) airfoil up to 22.75°, for a 70% relative airfoil thickness (t) airfoil up to 24.5° and for a 75% relative airfoil thickness (t) airfoil up to 26.25°. For angles of attack (aa) up to 30°, the suction peak is located at/behind 35% of the chord length (c).

The positioning of the suction peak for angles of attack (aa) between 15° and 25° is reached by the characteristic of the geometric curvature of the suction side (SS). The curvature of the suction side (SS) has a local or first maximum close to the leading edge (LE) at a chord position between 0% and 5% of the chord length (c), measured from the leading edge (LE). There is a second local maximum of the curvature close to the maximum relative airfoil thickness (t) position at 25% to 45% of the chord length (c). Between these local maxima, there is a local minimum of the curvature, where the curvature is lower than 78% of the value of the local curvature maximum close to the maximum relative airfoil thickness (t) position.

The airfoil profile according to the invention provides a novel and inventive combination of design and constructive characteristics resulting in an unexpected technical effect.

Conventional thick profiles, with or without a truncated trailing edge, show a pressure distribution were the point of the maximum negative pressure on the suction side of the profile moves close to the profile nose with increasing angles of attack. The local pressure on the profile surface corresponds to the local velocity of the profile and the pressure distribution for conventional profiles is, therefore, an image of the flow velocity distribution around the profile. Since thick profiles are preferably used in the region of the blade root, where the angle of attack of the profile increases compared to profiles more outboard of the blade, said conventional thick profiles have a maximum local speed, which is located close to the profile nose.

The profile of a rotor blade according to the invention provides the unique combination of a large relative airfoil thickness (t) at a high chordwise location (x_t) and a moderate trailing edge thickness (tTE) with a special curvature distribution of the suction side (SS), where the curvature is high at the leading edge (LE) and at the position of the maximum relative airfoil thickness (t), but much lower between these two maxima, which results in a position of the suction peak (minimum value of the pressure distribution at the suction side (SS)) behind 30% of the chord length (c) even at higher angles of attack (aa).

Figure 5C:
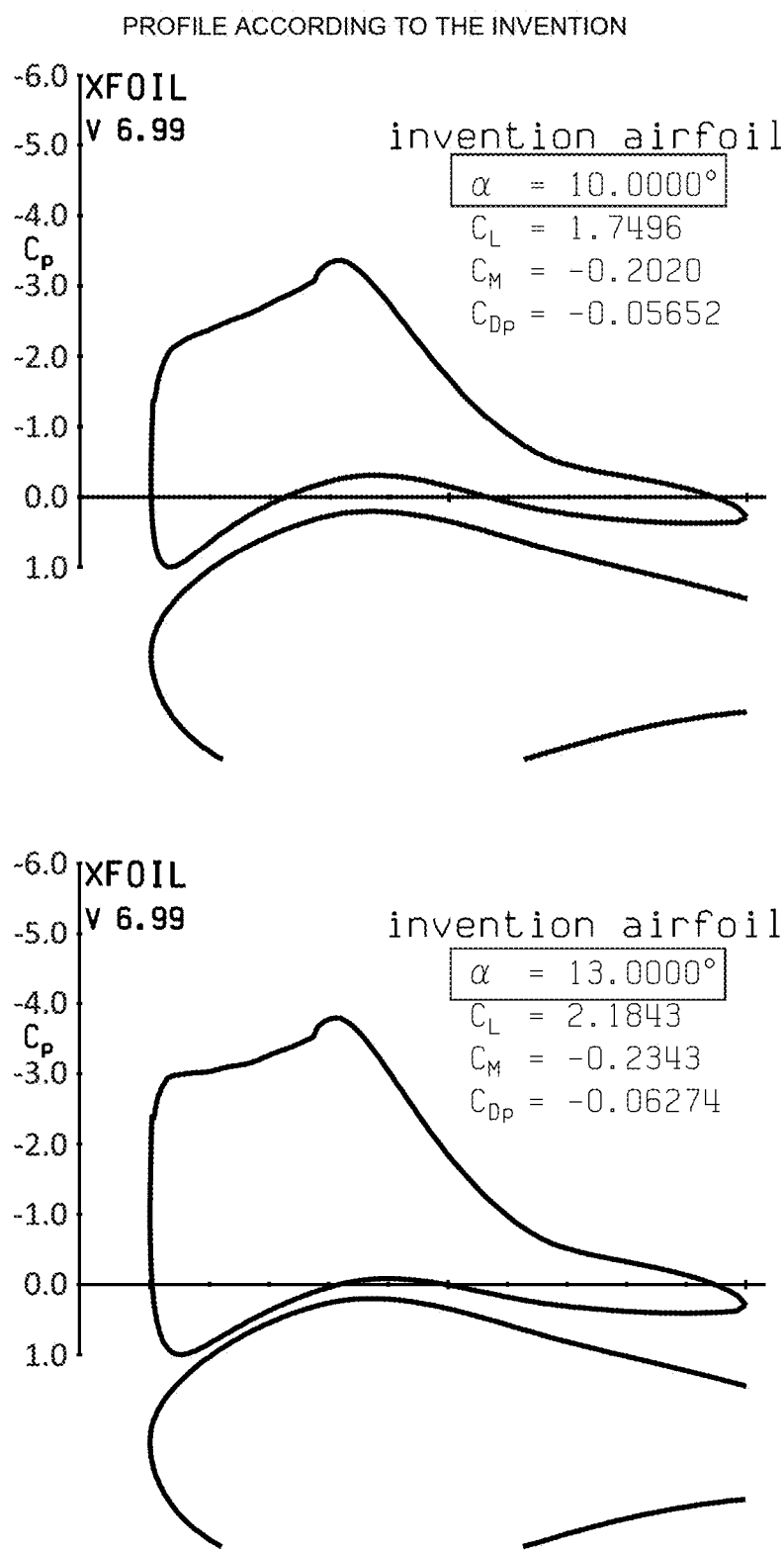
FIG. 5c shows the pressure distribution versus chord length along a thick profile according to the invention, at angles of attack of 10° and 13°.
Figure 6:
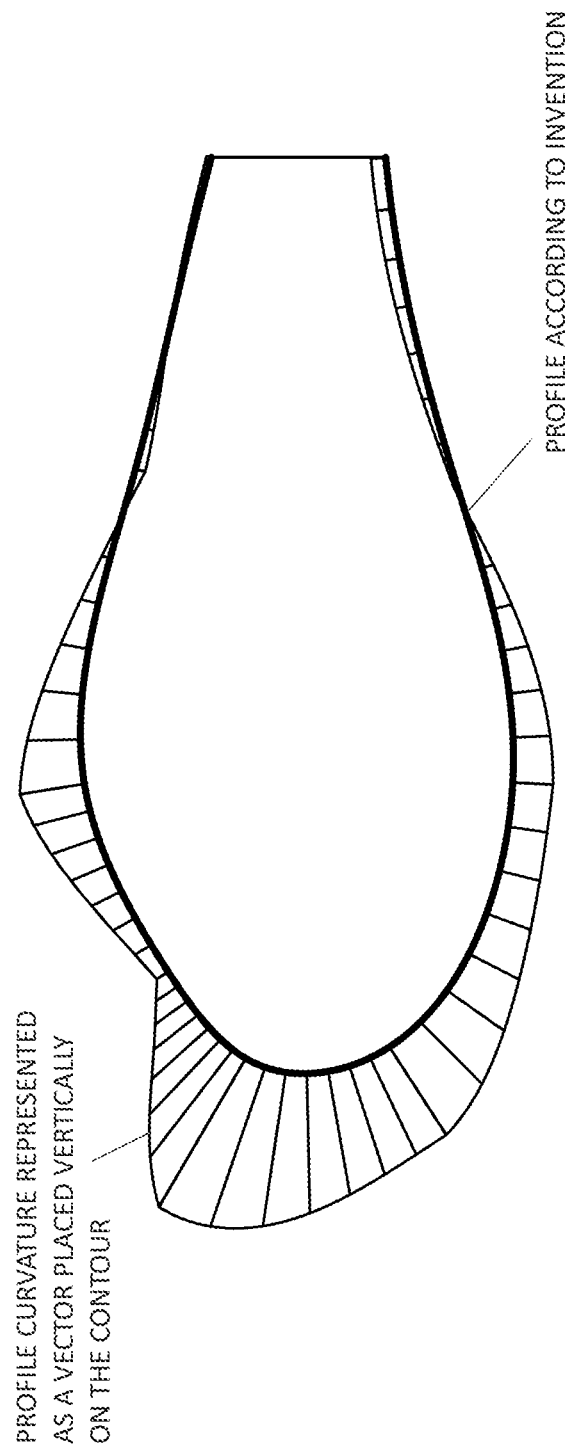
FIG. 6 shows a schematic view of the curvature distribution along a profile according to the invention, showing the curvature as a vector that is placed vertical on the contour. The longer the vector, the higher the curvature at this point. A local minimum between the maximum at the suction side close to the leading edge and a maximum at 35% chord is clearly visible.

This is particularly evidenced in FIG. 5, which shows the pressure distribution along conventional profiles A and B, both with about 50% relative profile airfoil thickness (t) compared to a similarly thick profile according to the invention, at the angles of attack (aa) of 10° and 13°, which are usual for such thick profiles. It is easy to see that the suction tip of the conventional profiles sits closer to the profile nose than in the profile according to the invention. It is to be noticed that $C_L$ represents the lift coefficient, $C_M$ the moment coefficient, $C_{Dp}$ the pressure drag coefficient and $C_p$ the pressure coefficient. The pressure coefficient Cp is the difference of the local static pressure (p) and the static pressure far away ($p_\infty$) from the airfoil, divided by the dynamic pressure (q), where:

$$C_p = (p - p_\infty)/q$$

$$q = rho/2 * v_\infty^2$$

On the above formula, rho stays for the fluid mass density and $v_\infty$ stays for the flow speed far away from the airfoil.

Even though the conditions according to the invention are extremely advantageous even for clean profiles, vortex generators and/or gurney flaps are both good solutions to increase even more the energy yield as they combine a good aerodynamic blade root efficiency with sufficient web height.

Since the profile according to the invention has a longer laminar running length due to the further behind positioned suction tip, it fulfils the compromise of a high local flow velocity generated further back on the profile better than other profiles, and vortex generators can thus sit in the area of the laminar boundary layer.

As a result of the described special features of the profiles according to the invention (high inflow velocity of the vortex generator further back on the profile with laminar boundary layer), the profile still works without flow separation at higher angles of attack (aa) and reduction of the drag, which is desired because the rotor blade can then provide more energy yield. At the same time, the height of the trailing edge (TE) can be reduced, what reduces material and production costs of the blade and the point of maximum relative airfoil thickness (t) of the profile can be pushed further towards the profile trailing edge (TE), which is especially advantageous for a lighter blade structure, material savings and also for lower loads to the turbine.

Finally, a wind turbine according to the invention is a wind turbine equipped with rotor blades according to the invention, wherein the blades comprise a high lift root profile with flat-back trailing edge (TE) with a suction side (SS) and a pressure side (PS), a relative airfoil thickness (t) in between 45% and 75%, preferably in between 48% and 70% of the chord length (c) and a trailing edge thickness (tTE) between 30% and 75%, preferably between 35% and 60% of the relative airfoil thickness (t), wherein the chord position (x_t) of the maximum relative airfoil thickness (t), measured from a leading edge (LE) towards the trailing edge (TE), is between 35% and 45%, preferably between 36% and 42% of the chord length (c).

CONCLUSION

It will be easily understood by those skilled in the art that modifications can be made to the present invention without departing from the concepts set out in the description above. Such modifications should be considered as comprised by the scope of the present invention. Consequently, the embodiments previously described in detail are illustrative and exemplary only and are non-restrictive as to the scope of the present invention, to which the full extent of the appended set of claims and any and all correspondents thereof should be given.

The invention claimed is:

1. A rotor blade for a wind turbine, wherein the rotor blade comprises a high lift root profile with flat-back trailing edge with a suction side and a pressure side,
   wherein a relative airfoil thickness is between 45% and 75% or between 48% and 70% of a chord length,
   wherein a trailing edge thickness is between 30% and 75% or between 35% and 60% of the relative airfoil thickness,
   wherein a chord position of a maximum relative airfoil thickness, which is measured from a leading edge towards the trailing edge, is between 35% and 45% or between 36% and 42% of the chord length, and
   wherein a curvature of the suction side has a first local maximum at a chord position between 0% and 5% of the chord length, a second local maximum of the curvature close to the maximum relative airfoil thickness position at 25% to 45% of the chord length, and a local minimum between the first and second local maxima, where the curvature is lower than 78% of a value of a local curvature maximum close to the maximum relative airfoil thickness position.

2. The rotor blade according to claim 1, wherein the geometry of the suction side is such that a suction peak of pressure distribution is located at a position of at least 30% of the chord length up to an angle of attack in degrees that is at least 35% of the relative airfoil thickness in percent of the chord length.

3. The rotor blade according to claim 2, wherein a vortex generator is placed at a location of the suction peak at the suction side.

4. A wind turbine, equipped with rotor blades having high lift root profiles with flat-back trailing edges with a suction side and a pressure side, wherein, for each of the rotor blades:
 a relative airfoil thickness is between 45% and 75 or between 48% and 70% of a chord length,
 a trailing edge thickness is between 30% and 75 or between 35% and 60% of the relative airfoil thickness,
 a chord position of a maximum relative airfoil thickness, which is measured from a leading edge towards the trailing edge, is between 35% and 45% or between 36% and 42% of the chord length, and
 a curvature of the suction side has a first local maximum at a chord position between 0% and 5% of the chord length, a second local maximum of the curvature close to the maximum relative airfoil thickness position at 25% to 45% of the chord length, and a local minimum between the first and second local maxima, where the curvature is lower than 78% of a value of a local curvature maximum close to the maximum relative airfoil thickness position.

5. The wind turbine according to claim 4, wherein the geometry of the suction side is such that a suction peak of pressure distribution is located at a position of at least 30% of the chord length up to an angle of attack in degrees that is at least 35% of the relative airfoil thickness in percent of the chord length.

6. The wind turbine according to claim 5, wherein a vortex generator is placed at a location of the suction peak at the suction side.

* * * * *